United States Patent
Marchese et al.

(10) Patent No.: US 6,297,334 B1
(45) Date of Patent: Oct. 2, 2001

(54) TFE POLYMERIZATION PROCESS

(75) Inventors: Enrico Marchese, Asti; Valery Kapeliouchko, Alessandria; Pasqua Colaianna, Milan, all of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/343,237

(22) Filed: Jun. 30, 1999

(30) Foreign Application Priority Data

Jul. 2, 1998 (IT) ............................... MI98A1519

(51) Int. Cl.$^7$ ................. C08F 14/26; C08F 2/32
(52) U.S. Cl. ............ 526/250; 526/78; 526/206; 526/209; 526/909; 526/911
(58) Field of Search .................... 526/250, 206, 526/909, 911

(56) References Cited

U.S. PATENT DOCUMENTS

| | | |
|---|---|---|
| 4,864,006 | 9/1989 | Giannetti et al. . |
| 4,990,283 | 2/1991 | Visca et al. . |
| 5,463,006 * | 10/1995 | Abusleme ............... 526/247 |
| 5,523,346 | 6/1996 | Wu . |
| 5,608,020 * | 3/1997 | Colaianna ............... 526/206 |
| 5,616,648 | 4/1997 | Wu . |
| 5,618,897 * | 4/1997 | Colaianna ............... 526/206 |

FOREIGN PATENT DOCUMENTS

| | | |
|---|---|---|
| 816397 A | 1/1998 | (EP) . |
| 1 556 316 A | 2/1969 | (FR) . |
| 96 22315 A | 7/1996 | (WO) . |

* cited by examiner

*Primary Examiner*—Fred Zitomer
(74) *Attorney, Agent, or Firm*—Arent Fox Kintner Plotkin Kahn PLLC

(57) ABSTRACT

Process for the preparation of tetrafluoroethylene (TFE) polymer-based dispersions having diameter average sizes in the range 0.005–0.06 $\mu$m, which comprises:

a) preparation of an aqueous perfluoropolyether (PFPE) microemulsion;

b) microemulsion feeding into the polymerization reactor, in such amounts so that the microemulsion perfluoropolyetheral oil phase is present in a concentration higher than 2 ml for liter of reaction medium;

c) reaction medium feeding in the gaseous TFE polymerization reactor, optional addition of surfactants, stabilizers, comonomers, transfer agents;

d) addition of the initiator, stabilizers, comonomers and transfer agents;

e) discharge from the reactor of the polymeric latex.

12 Claims, No Drawings

TFE POLYMERIZATION PROCESS

The invention relates to a process for preparing polytetrafluoroethylene (PTFE) aqueous dispersions having sizes in the range 5–60 nanometers, for at least 60% by weight of the dispersion particles.

More specifically the invention relates to a tetrafluoroethylene (TFE) radicalic polymerization process in aqueous emulsion, in the presence of an inert fluorinated phase previously mixed with a fluorinated surfactant and with water in ratios such as to give a microemulsion.

As it is well known, by microemulsion a system is meant wherein a phase with non reactive terminals is solubilized from a surfactant aqueous solution to give a monophasic solution which is stable in a long term and is obtained by simple mixing all the components.

The microemulsions are stable isotropic mixtures of oil, water and surfactant which are spontaneously formed when the ingredients are put together. Other components, such as salts or co-surfactants (alcohols, amines or other amphiphilics) can be a part of the microemulsion. Oil and water reside in distinct domaines separated by a surfactant-rich layer. Since these domains are small the microemulsions visually appear transparent or translucid. The microemulsions can show a variety of microstructures, mainly depending on their compositions and temperature. The common feature is the presence of a film or a surfactant rich interlayer which interposes among domains rich in water or oil. There are three structures among the most common ones. One is the so called microemulsion water in oil, wherein water is contained within distinct domains (droplet) surrounded by an oil-rich continuous phase. A second one is the microemulsion oil in water wherein oil is contained within distinct domaines surrounded by a continuous phase water rich. The third one is a bicontinuous structure in which zones of oil and water interlaced each other are present, the one separated from the other by surfactant rich layers.

The polymerization in the presence of microemulsion is known and shows a series of advantages in comparison with the conventional emulsion polymerization. Emulsions are opaque, while microemulsions are usually transparent or translucid, so as to be more suitable for photochemical type initiation. Moreover the possibility to have a higher number of particles per litre of water allows to increase the polymerization rate and to incorporate in the polymeric chains not very reactive monomers, without dramatic losses of the reaction yield.

In the U.S. Pat. No. 4,864,006 it is foreseen that the microemulsion can be diluted at the time when it is introduced in the reaction medium maintaining the above mentioned characteristics to guide the polymer particle nucleation and to determine the number thereof. In this patent no PTFE homopolymer polymerization examples are given; tests carried out by the Applicant (see the Examples) have shown that by operating in the conditions indicated in said patent, in the PTFE polymerization case, no dispersions of the order of nanometers as defined above are obtained.

In the U.S. Pat. No. 5,523,346 the choice of the oil phase to be used for obtaining the polymerizable unsaturated liquid monomer microemulsion is instead limited, and the microemulsion dilution method in the reaction medium, as indicated in the U.S. Pat. No. 4,864,006, is not used. In the U.S. Pat. No. 5,616,648 it is shown that in order to obtain fluoropolymer particles having the nanometer sizes as those of the present invention, the microemulsion use is necessary, the oil phase of which is the TFE polymerizable liquid monomer. It is well known that operating under these conditions is extremely dangerous due to the TFE explosiveness. According to this patent it is necessary that the weight ratio between surfactant and monomer is higher than 1.17 to obtain the polymer particles having the nanometer diameter as defined in this invention.

The substrata coating with fluorinated polymers is well known. In order to produce uniform films having a very low thickness (for example lower than 1 $\mu$m) using fluorinated solvents, it is necessary to operate through expensive processes with not negligible environmental impact. Moreover with the conventional fluoropolymer dispersions, formed by particles of 0.1–1.0 micron size, it is difficult to obtain uniform coatings on substrata showing microporosity. Besides, the large size particles can obstruct the submicronic porous structures, what is undesirable in some applications. In other applications the chemical and thermal stability given by the fluoropolymers in general and by the TFE homopolymers having a medium-high molecular weight in particular, is important.

The need was felt to have available polymerization techniques capable to give PTFE dispersions with very small particle size as defined above (from now on indicated as nanoemulsions), preferably characterized by an high thermal stability and by a suitable molecular weight.

An object of the present invention is a process for the preparation of dispersions based on tetrafluoroethylene (TFE) homopolymers, or based on its copolymers with one or more monomers containing at least one unsaturation of ethylenic type in amounts from 0–6 by moles, preferably 0 up to 3% by moles, more preferably from 0 to 1% by moles, having a particle fraction equal to at least 60% by weight, preferably 70% by weight, with diameter average sizes in the range 0.005–0.06$\mu$m (5–60 $\mu$m), preferably 0.01–0.05 $\mu$m, comprising:

a) preparation of an aqueous perfluoropolyether (PFPE) microemulsion having non reactive terminals, preferably (per)fluorinated terminals, optionally the terminals containing one or more H atoms, Cl instead of fluorine;

b) microemulsion feeding into the polymerization reactor, in amounts so that the microemulsion perfluoropolyethereal oil phase is present in a concentration higher than 2 ml per litre of reaction medium, preferably from 2.2 ml up to about 50 ml per litre, still more preferably from 3 to 30 ml per litre of reaction medium;

c) feeding of the reaction medium in the polymerization reactor, reactor degassing, reactor pressurization with gaseous TFE, optional addition of surfactants, stabilizers, comonomers, chain transfer agents;

d) initiator addition and optionally during the polymerization addition of further amounts of surfactants, stabilizers, comonomers, chain transfer agents;

e) discharge of the polymeric latex from the reactor.

The microemulsion feeding mentioned at point b) can also be carried out after feeding of the reaction medium and the other ingredients mentioned at point c).

Besides the components mentioned at points c) and d) other components commonly used in the TFE polymerization can be added. Among these, polymerization inhibitors, buffering agents, etc. can be mentioned.

During the polymerization additional initiator and the other components indicated in c) and in d) can be added even though they have already been introduced in the reactor at the reaction beginning.

A particular case of delayed feeding of comonomers is that aimed to alter and to control the surface properties of the PTFE particles. For instance a polar comonomer, such as VDF (vynilidene fluoride), CTFE, or non polar comonomers such as $C_2H_4$ or $C_3H6$, can be added at the final stage of the polymerization reaction in order to achieve a polymer particles surface with a higher surface tension.

This modification of the particles surface energy can be useful when a better blendability with materials like, for instance, polyacrylates, polystyrene or engineer plastics, is desired. Another application of this technique is the use of PTFE nanoemulsions as an ingredient in the polymerization of hydrogenated monomers (e.g. seed polymerization).

The discharged latex from the reactor can be subjected, if desired, to the usual post-treatments in connection with the specific uses. For example the discharged dispersion can be coagulated to obtain fine powders having a very high specific surface. The latex concentration, carried out for example, by ultrafiltration, can also be mentioned. Another post-treatment which can be carried out is the removal of the particles having larger sizes than those indicated above, for example by using ultracentrifugation.

It has been found by the Applicant that it is essential to refer not only to the average diameter of the particle size distribution, but also to the whole distribution. In particular, it is important that most particles belong to the very fine particle fraction, for example having an average diameter lower than 60 nm.

The dispersions obtained by the invention process, as such or after post-treatment, can also be used for the coating of substrata surfaces, for example surfaces of organic and/or inorganic polymers, of metals or ceramic surfaces, etc. Besides, the colloidal particles of the invention dispersions can be mixed with other materials, for example polymers, such as styreneacrylonitrile (SAN), polycarbonate, polyvinylchloride (PVC), polyphenylsulphides (PPS), polyesters and polyethers, polyamides such as Nylon, polyethylene, polypropylene, fluorinated polymers both of plastomeric and elastomeric type, perfluoropolyethereal polymers, metal dyes, inorganic compounds, etc. to give alloys and composites, stain-resistant articles, conductor materials for electronics, etc. The colloidal particles of the invention dispersions can, furthermore, be used as seed for the emulsion polymerization of fluorinated and hydrogenated monomers according to known methods.

The microemulsions used in the present invention process are described in the U.S. Pat. No. 4,864,006 and 4,990,283, herein incorporated by reference, wherein instead of the indicated non reactive terminal perfluoropolyethers, also hydrofluoropolyethers having one or both terminals containing an H atom, or having one or more chlorine atoms instead of fluorine in the chain terminals, can be used. The surfactants which can be used both to prepare the microemulsion and during the polymerization, are those described in the mentioned patents or those having a terminal in which one or more fluorine atoms are substituted by chlorine and/or hydrogen. The perfluoropolyether (PFPE) molecular weight which can be used can even be lower than 500, for example even 300 as average molecular weight by number. The nanoemulsions obtained with the PFPE use having low molecular weight in the range 350–600, preferably 350–500, can be used more advantageously in the applications wherein their quantitative removal is required.

The total surfactant amount used is such so that the weight ratio between surfactant and tetrafluoroethylene converted to polymer is always lower than 1.17, preferably lower than 1, more preferably lower than 0.25. The Applicant has surprisingly found that it is possible to prepare homopolymers or TFE copolymers having a nanometric particle size even by using very low surfactant amounts.

The PTFE molecular weight obtained by the process of the present invention, optionally containing the mentioned comonomer amounts, is such as to guarantee a good polymer chemical and thermal stability. Generally, the obtained molecular weights are higher than 50,000, usually in the range from 500,000 to 5,000,000, the first melting temperature is higher than 325° C. If desired, by the invention process also molecular weights lower than 50,000 can be obtained.

The ethylenic unsaturation comonomers which can be used are both of hydrogenated and fluorinated type; among the hydrogenated ones, ethylene, propylene, acrylic monomers, for example methylmethacrylate, (meth) acrylic acid, butylacrylate, hdyroxyethylhexylacrylate, styrene monomers, such as for instance styrene, can be mentioned. Among the fluorinated comonomers it can be mentioned:

$C_3$–$C_8$ perfluoroolefins, such as hexafluoropropene (HFP);

$C_2$–$C_8$ hydrogenated fluoroolefins, such as vinyl fluoride (VF), vinylidene fluoride (VDF), trifluoroethylene, hexafluoroisobutene, perfluoroalkylethylene $CH_2$=CH–$R_f$, wherein $R_f$ is a $C_1$–$C_6$ perfluoroalkyl;

chloro- and/or bromo- and/or iodo-fluoroolefins $C_2$–$C_8$, such as chlorotrifluoroethylene (CTFE);

(per)fluoroalkylvinylthers (PAVE) $CF_2$=$CFOR_f$, wherein $R_f$ is a $C_1$–$C_6$ (per)fluoroalkyl, for example $CF_3$, $C_2F_5$, $C_3F_7$;

(per)fluoro-oxyalkylvinylethers $CF_2$=CFOX, wherein X is: a $C_1$–$C_{12}$ alkyl, or a $C_1$–$C_{12}$ oxyalkyl, or a $C_1$–$C_{12}$ (per)fluorooxyalkyl having one or more ethereal groups, for example perfluoro-2-propoxy-propyl;

fluorodioxoles, preferably perfluorodioxoles.

The comonomers which do not substantially lower the PTFE thermal stability are preferred.

It has been found that once diluted, the microemulsion is no longer stable and a kinetically controlled degradation process of the original structure starts, for example by colapsing and increasing of oil droplets. Quantitative indications, to this purpose, can be obtained from the study of the microemulsion existence field and by Photon Correlation Spectroscopy (PCS) measurements carried out on the diluted systems. For this reason it is essential to consider, for example, the decrease of the oil droplet number in water consequent to dilution. It has been found that when microemulsions showing a quick degradative kinetics to dilution are used, it is necessary to take the utmost care to the choice of the phases following the microemulsion feeding in the reactor, until the completion of the polymer particle nucleation. For example it is advantageous to feed the microemulsion immediately before the reaction starting.

During the polymerization the temperatures and pressures typical of the TFE polymerization processes are used.

In the microemulsion containing as essential elements the (per) fluoropolyethereal oil phase, the fluorinated surfactant, water, and optionally co-surfactants such as alcohols, small amounts of other compounds can be dissolved in the fluorinated oil phase, the use of which is well known to the skilled in the art, such as for example transfer agents, initiators, functionalized comonomers, amorphous polymers such as for instance perfluorodioxole homopolymers or perfluorodioxole copolymers with TFE, perfluorocarbons, etc. This allows to use minimum amounts of compounds, which can have very high costs, although maintaining the maximum efficiency of their action.

Among the fluorinated surfactants suitable for obtaining the microemulsions object of the present invention, anionic fluorinated surfactants, for example fluorinated carboxylic acid or sulphonic acid salts, having a perfluoro-polyethereal or perfluorocarbon structure or partially fluorinated, cation surfactants, for example quaternary ammonium fluorinated salts, or also fluorinated non ionic surfactants, can be mentioned. The above mentioned surfactants can be used also in suitable mixtures.

The following examples are mentioned for illustrative but not limitative purposes of the invention scope.

EXAMPLES

In the Examples 1–9 the properties and the concerned parameters are determined by the analysis and characterization methods described hereinafter.

The first melting temperature and the crystallization heat determination is carried out by the differential calorimetry method, by using a Perkin Elmer DSC VII type calorimeter. About 10 mg of dried polymer are heated from room temperature up to 360° C. at a 10° C./min rate. The temperature corresponding to the melting endotherm peak is indicated as polymer first melting temperature. After 15 minutes of stay at 370° C., the polymer is cooled down to room temperature at a 10° C./min rate. The area subtended from the crystallization exotherm is integrated and its value, expressed in cal/g, is indicated as crystallization heat.

The particle average diameter is measured by a Laser light diffusion-based equipment, specifically based on Photon Correlation Spectroscopy, equipped with Brookhaven 2030 AT model correlator and Argon Laser light source having an wave length of 514.5 nm by Spectra-Phisics. The latex specimen to be subjected to measurement, are suitably diluted with bidistilled water and filtered at 0.2 μm on Millipore filter. The scattering measurement is carried out at room temperature and at a 90° angle. The latex particle diameter is obtained by the cumulant method.

It is well known to the skilled in the art that the PCS gives an estimation of the average hydrodynamic diameter. Here we interprete the term "particle average diameter" with the widest meaning connected with the determination of the hydrodynamic diameter. Therefore we do not put any limit to the shape or morphology of the polymer particles dispersed in the aqueous phase can show (cobblestone, rod-like, spheroidal and so on).

The polymer content of the latex discharged from the reaactor and of the surnatant obtained by ultracentrifugation is estimated by weight loss at 150° C. for 1 hour. Specifically about 20 grams of latex are weighed in a glass beaker and put in stove to dry for 1 hour at 150° C. The latex dry content is obtained from the formula:

Dry %=(weight after drying/latex initial weight)×100.

In order to determine the per cent fraction of solid seperated further to ultracentrifugation, the surnatant dry content after centrifugation with respect to the latex dry content before centrifugation, is normalized, according to the formula:

Separated solid %=(1-Dry in the surnatant %/Dry part in the latex %)×100

The polymer thermal stability is measured by using a Perkin Elmer, 7 series equipment. About 10 mg of dried polymer are heated from room temperature up to 425° C. at a 20° C./min rate. When 425° C. are reached, the temperature is automatically stabilized by the instrument and the sample is maintained at that temperature for 2 hours. The total per cent weight loss is then recorded and used as an index of the polymer thermal stability; the measurements are carried out in nitrogen atmosphere.

In order to have an estimation of the primary particle granulometry distribution, the latex is subjected to centrifugation at 5000 rpm for 1 hour, by using a Kontron Centrikon H401 ultracentrifuge. The separated surnatant is subjected to polymer content determination by weight loss and to determination of the primary particle average diameter, as previously described. In Examples 4–7 a further surnatant ultracentrifugation at 10,000 rpm for 1 hour is carried out and the polymer content by weight loss and the primary particle average diameter are again determined.

The surfactants used in Examples 1–9 are the following ones:

$ClC_3F_6O(C_3F_6O)_nCF_2COOH$ (I)

wherein n can range from 0 to 6.

Examples of the fluorinated phase with non reactive terminals are:

$R_fO(C_3F_6O)_{n'}(CFXO)_{m'}R'_f$ (II)

wherein n' and m' are integers such as to give the average molecular weight indicated in the examples, X=F, CF3; $R_f$, $R'_f$ equal to or different from each other are perfluoroalkyls from 1 to 3 carbon atoms.

Example 1

In a glass beaker 5 parts of an ammonic salt of an acid having the (I) structure with an acidimetric molecular weight equivalent to 530, 3 parts of a perfluoropolyether having the (II) type structure and molecular weight of about 700 and 8 parts of water are introduced. The resulting dispersion appears perfectly limpid in a temperature range between 2° C. and 46° C.

100 grams of the preceding dispersion, equivalent to 3.3 ml/liter of perfluoropolyether, are added to 3 liters of suitably degassed water in a 5 liter autoclave equipped with a mechanical stirrer and previously put under vacuum. The autoclave is kept under mechanical stirring and is pressurized with tetrafluoroethylene (TFE) up to a 20 bar pressure at a 80° C. temperature. At this point 100 cc of a $(NH_4)_2S_2O_8$ (APS) solution corresponding to 240 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is stably maintained at 80° C. After 77 minutes, the TFE feeding is stopped, the reactor evacuated and put under cooling. An aqueous dispersion containing 280 g/kg of polymeric resin is obtained, achieving a ratio of surfactant on monomer equal to 0.025.

The polymer primary particle diameter measured by Laser Light Scattering (LLS) results equal to 52 nm. After ultracentrifugation at 5,000 rpm for 1 hour, a solid amount (coarse particles) equal to 6.7% by weight of the total solid is separated and the LLS measurement on the surnatant phase gives a 49 nm value.

The DSC analysis shows a first melting point equal to 331.3° C. and a crystallization heat equivalent to 12.9 cal/g. This example shows that it is not necessary to respect a minimum ratio of 1.17 between surfactant and monomer to obtain PTFE particles of nanometric sizes, on the contrary of what reported in the prior art (U.S. Pat. No. 5,616,648).

Example 2

200 grams of the microemulsion of Example 1, equivalent to 6.6 ml/liter of perfluoropolyether, are added to 3 liters of suitably degassed water in a 5 liter autoclave equipped with a mechanical stirrer and previously put under vacuum. The autoclave is kept under mechanical stirring and is pressurized with TFE up to a 20 bar pressure at a 80° C. temperature. At this point 100 cc of a $(NH_4)_2S_2O_8$ (APS) solution corresponding to 240 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is stably maintained at 80° C. After 48 minutes, the TFE feeding is stopped, the reactor evacuated and put under cooling. An aqueous dispersion containing 280 g/kg of polymeric resin is obtained. In this case the surfactant/monomer ratio is equal to 0.05.

The polymer primary particle diameter measured by Laser Light Scattering (LLS) results equal to 53 nm. After ultracentrifugation at 5,000 rpm for 1 hour, a solid amount (coarse particles) equal to 5.9% by weight of the total solid is separated and the LLS measurement on the surnatant phase gives a 40 nm value.

The DSC analysis shows a first melting point equal to 332.4° C. and a crystallization heat equivalent to 12.4 cal/g. The resin shows at 425° C. in a 2 hours interval a loss in weight equivalent to 0.25%, index of a very good thermal stability.

Example 3

400 grams of the microemulsion of Example 1, equivalent to 13.2 ml/liter of perfluoropolyether, are added to 3 liters of suitably degassed water in a 5 liter autoclave equipped with a mechanical stirrer and previously put under vacuum. The autoclave is kept under mechanical stirring and is pressurized with tetrafluoroethylene (TFE) up to a 20 bar pressure at a 80° C. temperature. 3 grams of methoxydioxolene (MDO) and 150 mm/Hg of $C_2H_6$ are also introduced in the reactor. At this point 100 cc of a $(NH_4)_2S_2O_8$ (APS) solution equivalent to 240 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is stably maintained at 80° C. After 42 minutes, the TFE feeding is stopped, the reactor evacuated and put under cooling. An aqueous dispersion containing 155 g/kg of polymeric resin is obtained, the surfactant/monomer ratio is equal to 0.2.

The polymer primary particle diameter measured by Laser Light Scattering (LLS) results equal to 120 nm. After ultracentrifugation at 5,000 rpm for 1 hour, a solid amount (coarse particles) equal to 0.9% by weight of the total solid is separated and the LLS measurement on the surnatant phase gives a 34 nm value.

The DSC analysis shows a first melting point equal to 328° C. and a crystallization heat equivalent to 13.5 cal/g. The resin shows at 425° C. in a 2 hours interval a loss in weight equivalent to 0.72%, index of a good thermal stability even if lower than that of the homopolymer of Example 2.

Example 4

2,130 grams of the microemulsion of Example 1, equivalent to 6.8 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced. 500 cc of a $(NH_4)_2Fe(SO_4)_26H_2O$ (SdM) solution equivalent to 500 mg of SdM are fed in the autoclave. The autoclave is kept under mechanical stirring and is pressurized with TFE up to a 20 bar pressure at a 75° C. temperature. At this point 500 cc of a $(NH_4)_2S_2O_8$ (APS) solution equivalent to 1500 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 85° C. at a rate equivalent to 0.2° C./min. After 18 minutes, the TFE feeding is stopped, the reactor evacuated and put under cooling. An aqueous dispersion containing 225 g/kg of polymeric resin is obtained; the surfactant/monomer ratio is equal to 0.07.

The polymer primary particle diameter measured by Laser Light Scattering (LLS) results equal to 108 nm. After ultracentrifugation at 5,000 rpm for 1 hour, a solid amount (coarse particles) equal to 23.2% by weight of the total solid is separated and the LLS measurement on the surnatant phase gives a 35 nm value. The surnatant is subjected to a further centrifugation for 1 hour at 10,000 rpm. A solid amount equal to 24% by weight of the initial solid is separated and the LLS measurement on the surnatant phase gives a 17 nm value.

Example 5

2130 grams of the microemulsion of Example 1, equivalent to 6.8 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced. The autoclave is kept under mechanical stirring and is pressurized with TFE up to a 20 bar pressure at a 80° C. temperature. 500 cc of a $(NH_4)_2S_2O_8$ (APS) solution equivalent to 2,500 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 1000C at a rate equivalent to 1.0° C./min. After 25 minutes, the TFE feeding is stopped, the reactor evacuated and put under cooling. An aqueous dispersion containing 375 g/kg of polymeric resin is obtained.

The polymer primary particle diameter measured by Laser Light Scattering (LLS) results equal to 77 nm. After ultracentrifugation at 5,000 rpm for 1 hour, a solid amount (coarse particles) equal to 24.7% by weight of the total solid is separated and the LLS measurement on the surnatant phase gives a 50 nm value. The surnatant is subjected to a further centrifugation for 1 hour at 10,000 rpm. A solid amount equal to 19.2% by weight of the initial solid is separated and the LLS measurement on the surnatant phase gives a 46 nm value.

The DSC analysis shows a first melting temperature of 331.0° C. and a crystallization heat equivalent to 11.8 cal/g. The resin shows at 425° C. in a 2 hours interval a weight loss equivalent to 0.115%, index of a very good thermal stability.

Example 6

In a glass beaker 5 parts of an ammonic salt of an acid having the (I) structure with an acidimetric molecular weight equivalent to 530, 3 parts of a perfluoropolyether having the (II) type structure and molecular weight of 440 and 8 parts of water are introduced. The resulting dispersion appears perfectly limpid in a temperature range between 2° C. and 42° C.

30 liters of suitably degassed water are introduced in a 50 liter reactor. In the reactor also 140 grams of paraffin with softening point in the range 52° C.–54° C. were previously introduced. The reactor is kept under vacuum for 10 minutes and subsequently pressurized at 20 bar and heated up to 80° C. At this point 2130 grams of the preceding microemulsion, equivalent to 6.8 ml/liter of perfluoropolyether are fed into the reactor. Subsequently 500 cc of a $(NH_4)_2S_2O_8$ (APS) solution equivalent to 1,500 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 100° C. at a rate equivalent to 1.0° C./min. After 15 minutes, the TFE feeding is stopped, the reactor evacuated and put under cooling. An aqueous dispersion containing 245 g/kg of polymeric resin is obtained.

The polymer primary particle diameter measured by Laser Light Scattering (LLS) results equal to 71 nm. After ultra-centrifugation at 5,000 rpm for 1 hour, a solid amount (coarse particles) equal to 10.7% by weight of the total solid is separated and the LLS measurement on the surnatant phase gives a 51 nm value. The surnatant is subjected to a further centrifugation for 1 hour at 10,000 rpm. A solid amount equal to 38.5% by weight of the initial solid is separated and the LLS measurement on the surnatant phase gives a 37 nm value.

The resin shows at 425° C. in a 2 hours interval a weight loss equivalent to 0.0966, index of a very good thermal stability. This example shows how perfluoropolyethers having a molecular weight lower than 500 are usable.

Example 7 (comparative)

140 grams of the microemulsion of Example 1, equivalent to 0.44 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced. The autoclave is kept under mechanical stirring and is pressurized with TFE up to a 20 bar pressure at a 80° C. temperature. 500 cc of a $(NH_4)_2S_2O_8$ (APS) solution equivalent to 2500 mg of APS are sent into the autoclave.

When the pressure in the reactor has decreased of 0.5 bar, TFE is fed by a compressor so as to maintain a constant pressure of 20 bar inside the reactor. In the meantime the reactor internal temperature is raised up to 100° C. at a rate equivalent to 1.0° C./min. After 25 minutes, the TFE feeding is stopped, the reactor evacuated and put under cooling. An aqueous dispersion containing 250 g/kg of polymeric resin is obtained.

The polymer primary particle diameter measured by Laser Light Scattering (LLS) results equal to 90 nm. After ultra-centrifugation at 5,000 rpm for 1 hour, a solid amount (coarse particles) equal to 31% by weight of the total solid is separated and the LLS measurement on the surnatant phase gives a 69 nm value. The surnatant is subjected to a further centrifugation for 1 hour at 10,000 rpm. A solid amount equal to 68.8% by weight of the initial solid is separated and the LLS measurement on the surnatant phase, which at this point contains about 0.2% of solid polymer, gives a 84 nm value.

The DSC analysis shows a first melting temperature of 331.1° C. and a crystallization heat equivalent to 12 cal/g. This example shows that at the perfluoropolyether concentrations indicated in U.S. Pat. No. 4,864,006, the granulometric distributions of the present invention are not obtained.

Example 8 (comparative)

In a glass beaker 3 parts of an ammonic salt of an acid having the (I) structure with an acidimetric molecular weight equivalent to 545, 2 parts of a perfluoropolyether having the (II) type structure and molecular weight of 800 and 5 parts of water are introduced. The resulting dispersion appears perfectly limpid in a temperature range between 30° C. and 60° C.

433 grams of the preceding microemulsion, equivalent to 1.55 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced. 500 cc of a $(NH_4)_2S_2O_8$ (APS) solution equivalent to 220 mg of APS are fed into the autoclave. The autoclave is kept under mechanical stirring and is pressurized with TFE up to a 20 bar pressure at a 55° C. temperature. At this point 500 cc of a $(NH_4)_2Fe(SO_4)_2 \cdot 6H_2O$ (SdM) solution equivalent to 380 mg of SdM are sent into the autoclave.

When the pressure in the reactor has decreased of 0.5 bar, TFE is fed by a compressor so as to maintain a constant pressure of 20 bar inside the reactor. In the meantime the reactor internal temperature is raised up to 100° C. at a rate equivalent to 0.75° C./min. After 45 minutes, the TFE feeding is stopped, the reactor evacuated and put under cooling. An aqueous dispersion containing 250 g/kg of polymeric resin is obtained.

The polymer primary particle diameter measured by Laser Light Scattering (LLS) results equal to 115 nm. After ultracentrifugation at 5,000 rpm for 1 hour, a solid amount (coarse particles) equal to 44.5% by weight of the total is separated and the LLS measurement on the surnatant phase gives a 88 nm value.

The DSC analysis shows a first melting temperature of 334.1° C. and a crystallization heat equivalent to 10.1 cal/g. This example shows that at the perfluoropolyether concentrations indicated in U.S. Pat. No. 4,864,006, the granulometric distributions of the present invention are not obtained.

Example 9 (comparative)

200 grams of the microemulsion of Example 1, equivalent to 0.65 ml/liter of perfluoropolyether, are added to 30 liters of suitably degassed water in a 50 liter autoclave equipped with a mechanical stirrer and previously put under vacuum. In the reactor also 140 grams of paraffin with softening point in the range 52° C.–54° C. were previously introduced.

500 cc of a $(NH_4)_2S_2O_8$ (APS) solution equivalent to 1600 mg of APS are sent into the autoclave. 54 g of perfluoromethylvinylether are introduced in the autoclave. The autocclave is kept under mechanical stirring and is pressurized with TFE up to a 20 bar pressure at a 30° C. temperature. At this point 500 cc of a $(NH_4)_2Fe(SO_4)_2 \cdot 6H_2O$ (SdM) solution equivalent to 480 mg of SdM are sent into the autoclave.

When the pressure in the reactor has decreased of 0.5 bar, TFE is fed by a compressor so as to maintain a constant pressure of 20 bar inside the reactor. In the meantime the reactor internal temperature is raised up to 60° C. at a rate equivalent to 0.75° C./min. After 36 minutes, the TFE feeding is stopped, the reactor evacuated and put under cooling. An aqueous dispersion containing 190 g/kg of polymeric resin is obtained.

The polymer primary particle diameter measured by Laser Light Scattering (LLS) results equal to 83 nm. After ultra-centrifugation at 5,000 rpm for 1 hour, a solid amount (coarse particles) equal to 30.3% by weight of the total is separated and the LLS measurement on the surnatant phase gives a 79 nm value.

Also this example shows that at the perfluoropolyether concentrations indicated in U.S. Pat. No. 4,864,006, the granulometric distributions of the present invention are not obtained.

Example 11

1800 grams of the microemulsion of Example 1, equivalent to 5.7 ml/litre of perfluoropolyether, are added to 30 litres of suitably degassed water in a 50 litre autoclave equipped with a mechanical stirrer and previously put under vacuum. In the reactor also 140 grams of paraffin with softening point in the range 52° C.–54° C. were previously introduced. 100 grams of perfluoromethylvinylether (PMVE) are also introduced in the reactor. The autoclave is kept under mechanical stirring and is pressurized with TFE up to a 20 bar pressure at 82° C. At this point 500 cc of a $(NH_4)_2S_2O_8$ (APS) solution equivalent to 2,000 mg of APS are fed into the autoclave.

When the pressure in the reactor has decreased of 0.5 bar, TFE is fed by a compressor so as to maintain a constant pressure of 20 bar inside the reactor. In the meantime the

TABLE 1

|  | PFPE amount (ml/l) | Molecular weight PFPE | Surfactant/ monomer | Particle Average Diameter LLS (nm) | 5,000 rpm Sol % | 5,000 rpm $\Phi_P$ nm | 10,000 rpm Sol % | 10,000 rpm $\Phi_P$ nm |
|---|---|---|---|---|---|---|---|---|
| Example 1 | 3.3 | 700 | 0.025 | 52 | 6.7 | 49 | — | — |
| Example 2 | 6.6 | 700 | 0.05 | 53 | 5.9 | 40 | — | — |
| Example 3 | 13.2 | 700 | 0.2 | 120 | 0.9 | 34 | — | — |
| Example 4 | 6.8 | 700 | 0.07 | 108 | 23.2 | 35 | 24 | 17 |
| Example 5 | 6.8 | 700 | 0.04 | 77 | 24.7 | 50 | 19.2 | 46 |
| Example 6 | 6.8 | 440 | 0.07 | 71 | 10.7 | 51 | 38.5 | 37 |
| Example 7 (comp.) | 0.44 | 700 | 0.005 | 90 | 31 | 69 | 68.8 | 84 |
| Example 8 (comp.) | 1.55 | 800 | 0.014 | 115 | 44.5 | 88 | — | — |
| Example 9 (comp.) | 0.65 | 700 | 0.008 | 83 | 30.3 | 79 | — | — |

Example 10

3175 grams of the microemulsion of Example 1, equivalent to 10.1 ml/litre of perfluopolyether, are added to 30 litres of suitably degassed water in a 50 litre autoclave equipped with a mechanical stirrer and previously put under vacuum. In the reactor also 140 grams of paraffin with softening point in the range 52° C.–54° C. were previously introduced. 900 mbar of $C_2H_6$ are also introduced in the reactor. The autoclave is kept under mechanical stirring and is pressurized with TFE up to a 20 bar pressure at 88° C. At this point 500 cc of a $(NH_4)_2S_2O_8$ (APS) solution equivalent to 5,000 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 100 ° C. at a rate equivalent to 0.67 ° C./min. and 100 cc of a solution containing 2 gr. of APS per litre of demineralized water were injected at 8 ml/min. After 14 minutes, the TFE feeding is stopped, the reactor evacuated and put under cooling. An aqueous dispersion containing 203 g/Kg of polymeric resin is obtained; the surfactant/monomer ratio is equal to 0.13.

The polymer primary particle diameter measured by Laser Light Scattering (LLS) results equal to 23 nm. After ultra-centrifugation at 5,000 rpm for 1 hour, a solid amount (coarse particles) equal to 1% by weight of the total solid is separated and the LLS measurement on the surnatant phase gives a 12.6 nm value.

The DSC analysis shows a first melting temperature of 325° C. and a crystallization heat equivalent to 17.3 cal/g.

reactor internal temperature is raised up to 100° C. at a rate equivalent to 0.4° C./min. After 20 minutes, the TFE feeding is stopped, the reactor evaquated and put under cooling. An aqueous dispersion containing 272 g/Kg of polymeric resin is obtained; the surfactant/monomer ratio is equal to 0.047.

The polymer primary particle diameter measured by Laser Light Scattering (LLS) results equal to 35 nm. After ultra-centrifugation at 5,000 rpm for 1 hour, a solid amount (coarse particles) equal to 1.9% by weight of the total solid is separated and the LLS measurement on the surnatant phase gives a 30 nm value.

The DSC analysis shows a first melting temperature of 327.4° C. and a crystallization heat equivalent to 8.2 cal/g.

Example 12

2,540 grams of microemulsion of Example 1, equivalent to 8.1 ml/litre of perfluoropolyether, are added to 30 litres of suitably degassed water in a 50 litre autoclave equipped with a mechanical stirrer and previously put under vacuum. The autoclave is kept under mechanical stirring and is pressurized with TFE up to a 20 bar pressure at 82° C. At this point 500 cc of a $(NH_4)_2S_2O_8$ (APS) solution equivalent to 2,500 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 90° C. at a rate equivalent to 0.4° C./min. After 35 minutes, the TFE feeding is stopped. The reaction is allowed to continue until the pressure falls to 7.5 bar, after that 250 grams of $C_2H_4$ are fed into the autoclave, the pressure is brought up to 15 bar. The reaction is allowed to continue until pressure falls to 12.5 bar, after that the reactor evacuated and put under cooling. An aqueous dispersion containing 252 g/Kg of polymeric resin is obtained; the surfactant/monomer ratio is equal to 0.072.

The polymer primary particle diameter measured by Laser Light Scattering (LLS) results equal to 52 nm. After ultracentrifugation at 5,000 rpm for 1 hour, a solid amount (coarse particles) equal to 4.4% by weight of the total solid is separated and the LLS measurement on the surnatant phase gives a 32 nm value.

Example 13

In a glass beaker 27.5 parts of an ammonic salt of an acid having the (I) structure with an acidimetric molecular weight equivalent to 530, 7.5 parts of 0.5 wt% solution of an amorphous perfluorodioxole copolymer with TFE in perfluoropolyether having (II) type structure and molecular weight of about 700 and 65 parts of water are introduced. The resulting dispersion appears perfectly limpid in a temperature range between 17° C. and 33° C.

2,540 grams of the preceding microemulsion, equivalent to 3.6 ml/litre of perfluoropolyether, are added to 30 litres of suitably degassed water in a 50 litre autoclave equipped with a mechanical stirrer and previously put under vacuum. In the reactor also 140 grams of paraffin with softening point in the range 52° C.–54° C. were previously introduced. 125 grams of perfluoropropylvinylether (PPVE) are also introduced in the reactor. The autoclave is kept under mechanical stirring and is pressurized with TFE up to a 20 bar pressure at 82° C. At this point 500 cc of a $(NH_4)_2S_2O_8$ (APS) solution equivalent to 2,000 mg of APS are fed into the autoclave.

When the pressure in the reactor has decreased of 0.5 bar, TFE is fed by a compressor so as to maintain a constant pressure of 20 bar inside the reactor. In the meantime the reactor internal temperature is raised up to 90° C. at a rate equivalent to 0.4° C./min. After 30 minutes, the TFE feeding is stopped the reactor evacuated and put under cooling. An aqueous dispersion containing 286 g/Kg of polymeric resin is obtained; the surfactant/monomer ratio is equal to 0.058.

The polymer primary particle diameter measured by Laser Light Scattering (LLS) results equal to 40 nm. After ultracentrifugation at 5,000 rpm for 1 hour, a solid amount (coarse particles) equal to 3.5% by weight of the total solid is separated and the LLS measurement on the surnatant phase gives a 25 nm value.

The DSC analysis shows a first melting temperature of 326.5° C. and a crystallization heat equivalent to 6.5 cal/g.

What is claimed is:

1. A process for preparing dispersions based on tetrafluoroethylene (TFE) homopolymer, or based on copolymers of tetrafluoroethylene (TFE) with one or more monomers containing at least one ethylenic unsaturation in amounts from 0% to 6% by moles, wherein 60% by weight of the particle fraction has an average diameter size in the range 0.005 to 0.06 µm, which comprises:
   a) preparing an aqueous microemulsion of perfluoropolyethers (PFPE), said perfluoropolyethers having (per) fluorinated terminals, optionally the terminals contain one or more H atoms, and chlorine instead of fluorine;
   b) feeding said aqueous microemulsion of perfluoropolyethers into a polymerization reactor, in amounts wherein a microemulsion perfluoropolyethereal oil phase is present in a concentration greater than 2 ml per liter of reaction medium;
   c) feeding a reaction medium into the polymerization reactor, said reaction medium comprising a degassed aqueous component and optionally surfactants, stabilizers, comonomers, and transfer agents;
   d) pressurizing the polymerization reactor by introducing therein gaseous TFE;
   e) adding an initiator and optionally during the polymerization adding further amounts of surfactant, stabilizers, comonomer, and transfer agents; and
   f) discharging from the reactor polymeric latex.

2. A process according to claim 1 wherein the monomers containing at least one ethylenic unsaturation are present in amounts from 0 up to 3% by moles and the average diameter of a particle is in the range 0.01–0.05 µm, and wherein the microemulsion perfluoropolyethereal oil phase is present in a concentration from 3 to 30 ml per liter of reaction medium.

3. The process according to claims 1 wherein the microemulsion feeding mentioned of b) is carried out after feeding the reaction medium and the other ingredients indicated at c).

4. A process according to claims 1 wherein, during the polymerization, additional initiator and the other components indicated in c) and in e) are added.

5. A process according to claim 4 wherein the polymer latex discharged is subjected to ultracentrifugation.

6. The process a according to claims 1 wherein the dispersion colloidal particles are mixed with other materials selected from the group consisting of styreneacrylonitrile (SAN), polycarbonate; polyvinylchloride (PVC); polyphenylsulphides (PPS); polyamides; polyethylene; polypropylene; polyesters and polyether; fluorinated polymers, plastomeric and elastomeric; perfluoropolyethereal polymers, metal dyes, and inorganic compounds.

7. The process according to claim 1, wherein the total surfactant amount used is such that the weight ratio between surfactant and tetrafluoroethylene converted to polymer is always less than 1.17.

8. A process according to claim 7, wherein the total surfactant amount used is such that the weight ratio between surfactant and tetrafluoroethylene converted to polymer is less than 1.

9. A process according to claims 1 wherein the comonomers having an ethylenic umsaturation are both hydrogenated and fluorinated.

10. A process according to claim 9 wherein the hydrogenated comonomers are selected from ethylene, propylene, acrylic monomers, and styrene monomers; and the fluorinated comonomers are selected from:
   $C_3$–$C_8$ perfluoroolefins;
   $C_2$–$C_8$ hydrogenated fluoroolefins;
   $C_2$–$C_8$ chloro- and/or bromo- and/or iodo-fluoroolefins;
   (per)fluoroalkylvinylethers (PAVE) $CF_2$=$CFOR_f$, wherein $R_f$ is a $C_1$–$C_6$ (per)fluoroalkyl; and
   (per)fluoro-oxyalkylvinylethers $CF_2$=CFOX, wherein X is: a $C_1$–$C_{12}$ alkyl, or a $C_1$–$C_{12}$ oxyalkyl, or a $C_1$–$C_{12}$ (per)fluorooxyalkyl having one or more ethereal groups.

11. The process according to claim 1 wherein the microemulsion is fed into the reactor before the start of the reaction.

12. A process according to claim 1 wherein the microemulsion further comprises co-surfactants, transfer agents, initiators, functionalized comonomers, and amorphous polymers.

* * * * *